US011306687B2

(12) United States Patent
Nagai et al.

(10) Patent No.: US 11,306,687 B2
(45) Date of Patent: Apr. 19, 2022

(54) ENGINE EXHAUST MANIFOLD

(71) Applicant: KUBOTA Corporation, Osaka (JP)

(72) Inventors: Kentaro Nagai, Sakai (JP); Ryutaro Komura, Sakai (JP); Takashi Yamaguchi, Sakai (JP); Kumiko Sakaguchi, Sakai (JP); Takahiro Yamazaki, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/096,928

(22) Filed: Nov. 12, 2020

(65) Prior Publication Data

US 2021/0199074 A1 Jul. 1, 2021

(30) Foreign Application Priority Data

Dec. 31, 2019 (JP) .............................. JP2019-240089
Dec. 31, 2019 (JP) .............................. JP2019-240090
Dec. 31, 2019 (JP) .............................. JP2019-240091

(51) Int. Cl.
*F02B 47/08* (2006.01)
*F02M 26/05* (2016.01)
*F02M 26/43* (2016.01)
*F01N 13/10* (2010.01)
*F02F 1/24* (2006.01)

(52) U.S. Cl.
CPC ............ *F02M 26/05* (2016.02); *F02M 26/43* (2016.02); *F01N 13/10* (2013.01); *F02F 1/243* (2013.01)

(58) Field of Classification Search
CPC ........ F02M 26/32; F02M 26/28; F02M 26/12; F28D 21/0003

USPC .................................................... 123/568.12
See application file for complete search history.

(56) References Cited

U.S. PATENT DOCUMENTS

| 4,226,217 | A | 10/1980 | Haslbeck et al. | |
|---|---|---|---|---|
| 4,610,326 | A | 9/1986 | Kirchweger et al. | |
| 6,311,678 | B1* | 11/2001 | Lepoutre | F28D 7/16 123/184.61 |
| 7,625,257 | B1* | 12/2009 | Broman | F01P 3/12 440/89 B |
| 2002/0005190 | A1* | 1/2002 | Bianchi | F02M 26/30 123/568.12 |

(Continued)

FOREIGN PATENT DOCUMENTS

DE 102017129305 A1 6/2018
EP 1331388 A2 7/2003

(Continued)

OTHER PUBLICATIONS

Partial European Search Report dated Feb. 22, 2021 in European Application No. 20204295.8.

(Continued)

*Primary Examiner* — Long T Tran
*Assistant Examiner* — James J Kim
(74) *Attorney, Agent, or Firm* — Panitch Schwarze Belisario & Nadel LLP

(57) ABSTRACT

An engine exhaust manifold including exhaust inlet parts at four locations corresponding to a plurality of exhaust ports, one exhaust outlet part, and an exhaust confluence part to collect exhaust gas from each of the exhaust inlet parts and send to the exhaust outlet part. An EGR passage part to send EGR gas toward an intake passage is formed.

16 Claims, 10 Drawing Sheets

(56) References Cited

U.S. PATENT DOCUMENTS

| | | | |
|---|---|---|---|
| 2005/0247294 A1* | 11/2005 | Rowells | F01N 13/10 |
| | | | 123/568.17 |
| 2007/0068492 A1 | 3/2007 | Hataura et al. | |
| 2009/0090108 A1 | 4/2009 | Perrin et al. | |
| 2011/0061630 A1 | 3/2011 | Yoshii et al. | |
| 2012/0240879 A1 | 9/2012 | Kishi et al. | |
| 2015/0128921 A1 | 5/2015 | Paull | |
| 2016/0025045 A1* | 1/2016 | Engineer | F02M 26/28 |
| | | | 123/568.12 |
| 2017/0268414 A1* | 9/2017 | Choi | F02M 26/44 |
| 2018/0162218 A1 | 6/2018 | Kim | |
| 2018/0274497 A1* | 9/2018 | Choi | F02M 26/20 |
| 2019/0249573 A1 | 8/2019 | Bostwick et al. | |
| 2019/0301405 A1 | 10/2019 | Haaland et al. | |
| 2021/0071623 A1* | 3/2021 | Haaland | F01N 13/08 |

FOREIGN PATENT DOCUMENTS

| | | |
|---|---|---|
| EP | 2444615 A1 | 4/2012 |
| JP | 2005-291002 A | 10/2005 |
| JP | 2013-096347 A | 5/2013 |
| JP | 2013136989 A | 7/2013 |
| JP | 2013-199881 A | 10/2013 |
| WO | 2019123936 A1 | 6/2019 |

OTHER PUBLICATIONS

Extended European Search Report dated Mar. 17, 2021 in European Application No. 20204295.8.

* cited by examiner

ENGINE EXHAUST MANIFOLD

CROSS-REFERENCE TO RELATED APPLICATION

This application claims priority under 35 U.S.C. § 119(b) to Japanese Patent Application No. 2019-240089, filed Dec. 31, 2019, Japanese Patent Application No. 2019-240090, filed Dec. 31, 2019, and Japanese Patent Application No. 2019-240091, filed Dec. 31, 2019, the disclosures of which are incorporated herein by reference in their entirety.

BACKGROUND OF THE INVENTION

Field of the Invention

The present invention relates to an engine exhaust manifold, which is an exhaust manifold applied to a diesel engine that is provided with an EGR and mounted on an agricultural tractor or a backhoe.

Description of Related Art

With stricter exhaust gas regulations, the number of engines adopting an exhaust gas recirculation (EGR) system is increasing. That is, it is a device that extracts a part of exhaust gas from an exhaust manifold and returns the part of exhaust gas to an intake passage through a dedicated EGR passage.

Normally, the EGR passage generally has a structure called "external EGR", which is configured with a passage component different from the exhaust manifold and an engine body (a cylinder head).

The following (1) and (2) can be mentioned as problems and points to be improved in the external EGR.

(1) Since the EGR passage (path) is configured with a separate component, the EGR passage and a structure in the vicinity (the exhaust manifold, or the like) may interfere with each other due to vibration, and may be damaged or broken. Therefore, it is necessary to provide an appropriate gap between those two, which tends to make the engine bulky (larger).

(2) Since the EGR passage is often configured using a long pipe material, there is a disadvantage that strength and rigidity tend to be insufficient, and there is a risk of damage such as cracks due to vibration.

SUMMARY OF THE INVENTION

An object of the present invention is to provide an improved engine exhaust manifold that can also be reliably applied to a small engine, by devising a structure focusing on an exhaust manifold having relatively sufficient strength, to enable sufficient strength of an EGR passage and arrangement in a saved space.

In the present invention, an engine exhaust manifold includes: an exhaust inlet part corresponding to a plurality of exhaust ports; one exhaust outlet part; and an exhaust confluence part to collect exhaust gas from the exhaust inlet part and send to the exhaust outlet part. In the engine exhaust manifold, an EGR passage part to send EGR gas toward an intake passage is formed.

According to the present invention, since the EGR passage (an EGR passage part) is integrally formed with the exhaust manifold, strength and rigidity as the EGR passage is improved. This eliminates or substantially eliminates the conventional problem that the EGR passage and a structure in the vicinity (such as the exhaust manifold, or the like) may interfere with each other due to vibration, and may be damaged or broken.

The exhaust manifold is excellent in strength and rigidity, which eliminates a phenomenon that the EGR passage comes into contact with a structure in the vicinity other than the exhaust manifold. Further, the EGR passage part and the exhaust manifold are integrated, which solves the conventional problem that the engine tends to be bulky (larger) due to the need to provide a certain gap.

As a result, it is possible to provide an improved engine exhaust manifold that can also be reliably applied to a small engine, by devising a structure focusing on an exhaust manifold having relatively sufficient strength, to enable sufficient strength of an EGR passage and arrangement in a saved space.

DETAILED DESCRIPTION OF PREFERRED EMBODIMENTS

Hereinafter, regarding an exhaust manifold for an industrial diesel engine suitable for agricultural tractors and the like, an embodiment of an engine exhaust manifold according to the present invention will be described with reference to the drawings.

Figure 1:
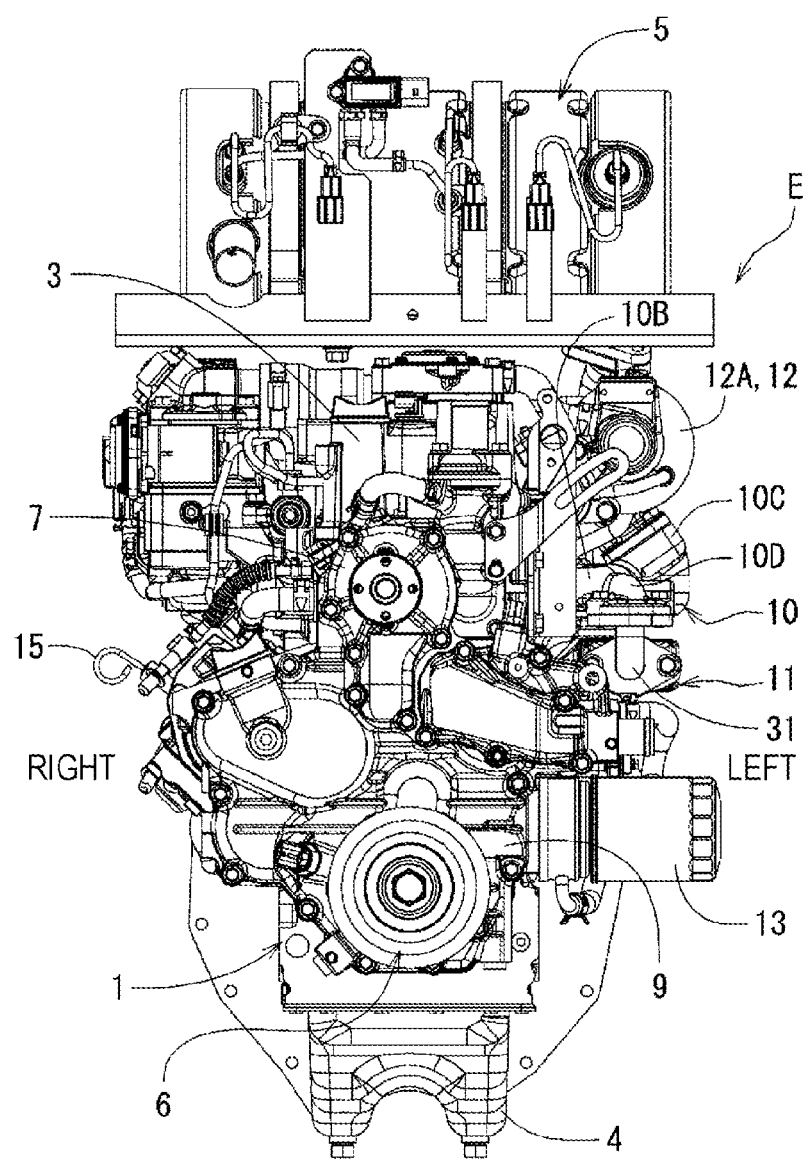
FIG. 1 is a front view of a diesel engine with EGR.
Figure 2:
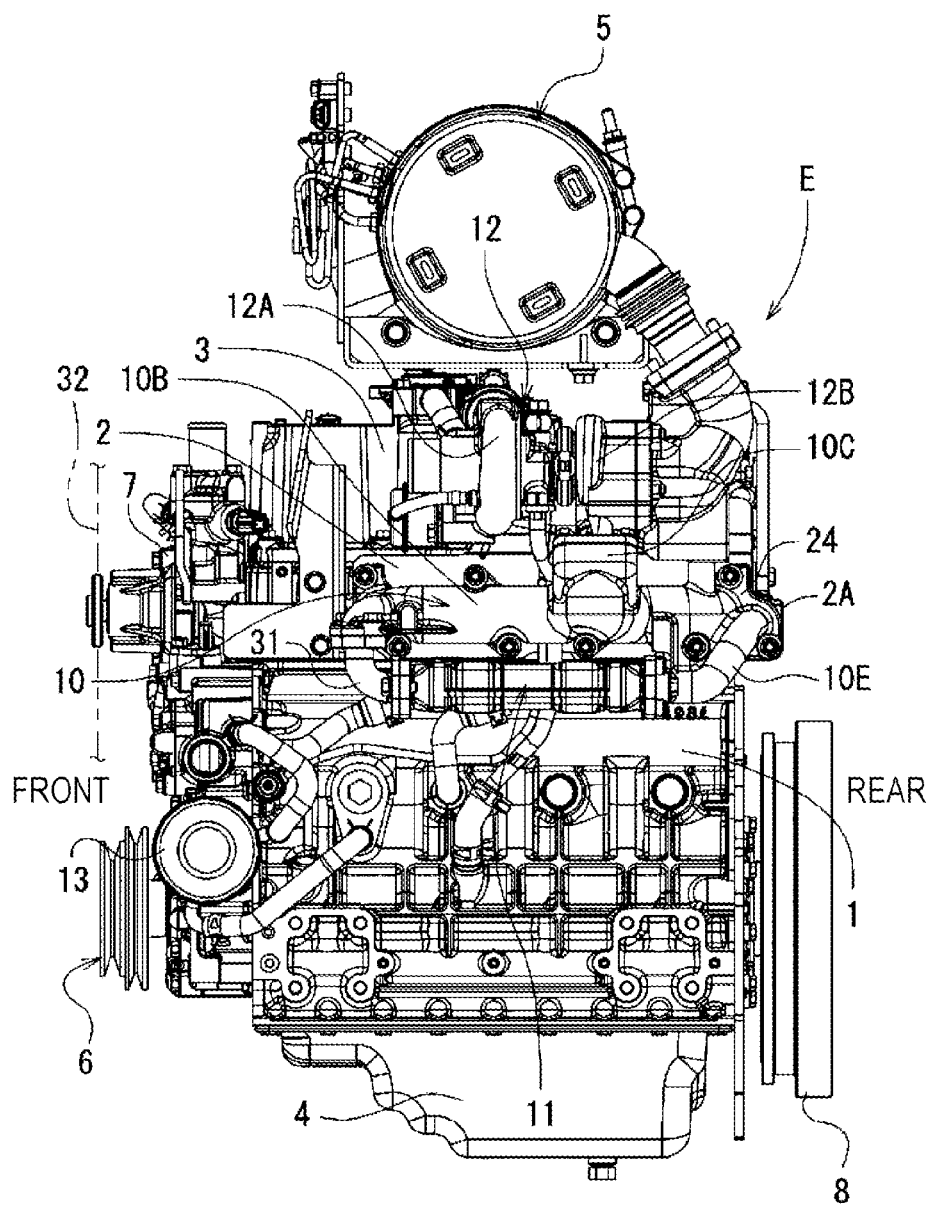
FIG. 2 is a left side view of the engine in FIG. 1.
Figure 3:
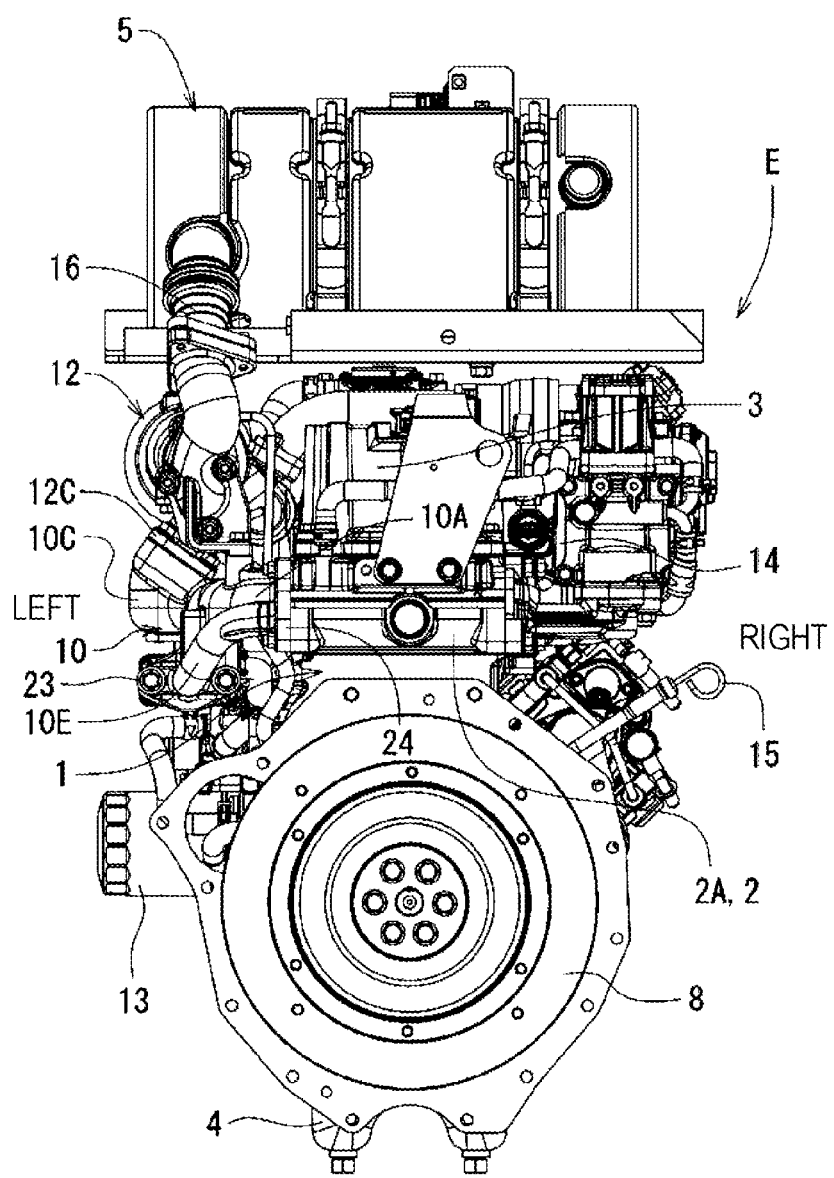
FIG. 3 is a rear view of the engine in FIG. 1.

FIGS. 1 to 3 show an in-line 4-cylinder diesel engine with EGR (hereinafter simply referred to as an engine) E. In this engine E, a cylinder head 2 is assembled on a cylinder block 1, and a head cover 3 is assembled on the cylinder head 2. An oil pan 4 is assembled below the cylinder block 1, and an exhaust treatment device 5 is mounted above the head cover 3.

On a front side of the engine E, a transmission case 9, a crank pulley (a drive pulley) 6, a water pump 7, and the like are arranged, and a flywheel 8 is arranged on a rear side. On a left side of the engine E, an exhaust manifold (an engine exhaust manifold with EGR) 10, an EGR cooler 11, a supercharger 12, an oil filter 13, and the like are arranged, and an intake manifold 14, an oil level gauge 15, and the like are arranged on a right side.

As shown in FIG. 2, the exhaust manifold 10 is mounted to a left side surface of the cylinder head 2 by bolting, and an exhaust introduction part 12C of the supercharger 12 is connected to an exhaust outlet part 10C of the exhaust manifold 10 by bolting. Further, at a position directly below the exhaust manifold 10, the EGR cooler 11 is arranged in a front-rear position in which both ends are supported by the exhaust manifold 10. The supercharger 12 is a turbocharger having a turbine 12B provided with the exhaust introduction part 12C, and a compressor 12A.

Figure 4:
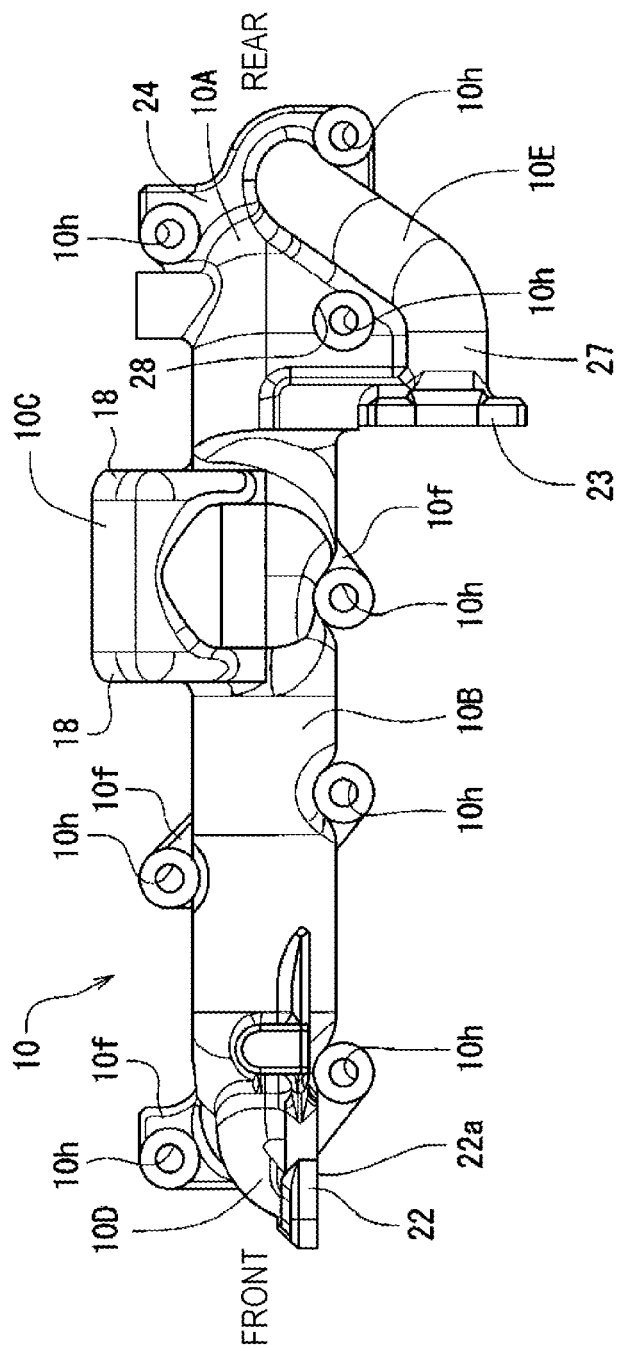
FIG. 4 is a left side view of an exhaust manifold.
Figure 5:
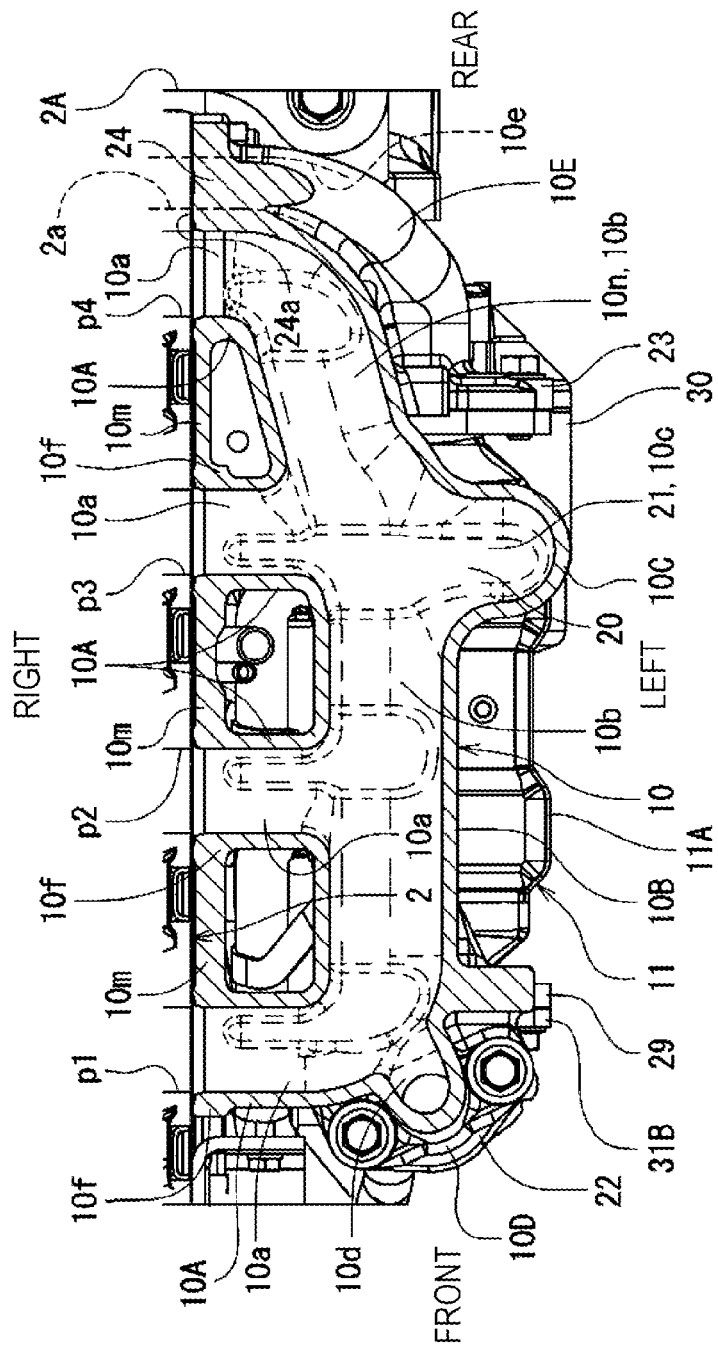
FIG. 5 is a cross-sectional plan view of the exhaust manifold cut horizontally at a confluence pipe part and viewed from above.
Figure 6:
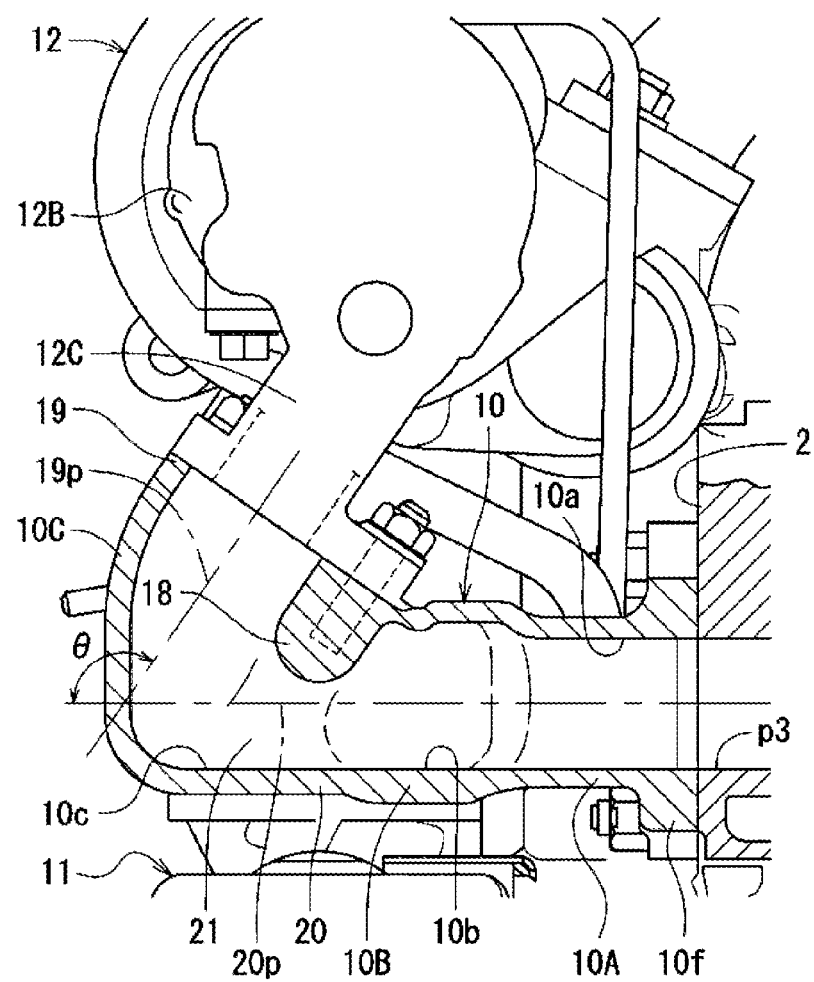
FIG. 6 is a cross-sectional rear view of the exhaust manifold cut vertically at an exhaust outlet part and viewed from behind.
Figure 7:
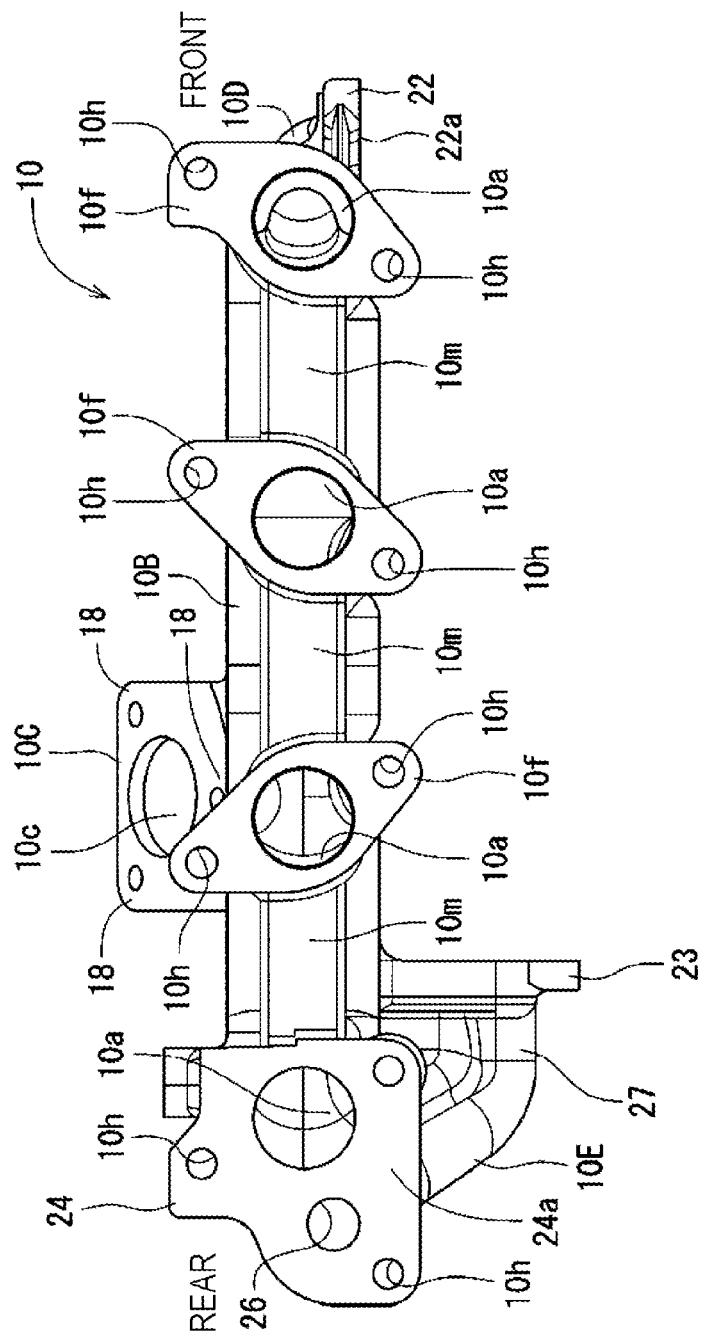
FIG. 7 is a right side view of the exhaust manifold.

As shown in FIGS. 4 to 6, the exhaust manifold 10 includes: four (an example plurality) exhaust branch pipes 10A connected to individual exhaust ports p1, p2, p3, and p4 of the cylinder head 2; a confluence pipe part 10B that connects end parts of individual exhaust branch pipes 10A with each other; an exhaust outlet part 10C; a gas lead-out part 10D; and an EGR passage part 10E. The exhaust manifold 10 is made of cast iron, and a plurality of bolt holes 10h are formed mainly in each exhaust branch pipe 10A.

Exhaust gas discharged from the cylinder head 2 to the four exhaust branch pipes 10A is merged at the confluence pipe part 10B. A part of the exhaust gas flows to the EGR cooler 11 from the gas lead-out part 10D formed at a front end part of the confluence pipe part 10B, and the remaining exhaust gas flows to the supercharger 12 from the exhaust outlet part 10C. Note that the gas lead-out part 10D and the EGR passage part 10E are formed with front and rear flange parts 22 and 23 to bolt and connect the EGR cooler 11.

Each exhaust branch pipe 10A is formed with a mounting flange 10f that has a pair of bolt holes 10h and 10h and is for mounting on the cylinder head 2. A fourth exhaust branch pipe 10A at a tail end also exhibits a function of bolting and connecting the EGR passage part 10E to a terminal-side EGR passage part 2A (described later), and therefore is formed on a large mounting flange (an example of a terminal mounting part) 24 having three bolt holes 10h. In FIG. 5, there is formed a connecting wall part 10m that can contribute to improvement of strength and rigidity by connecting adjacent mounting flanges 10f and 10f (or 24) in front and rear, but the individual mounting flanges 10f and 24 may be independent of each other with the connecting wall part 10m omitted.

The exhaust gas from the gas lead-out part 10D passes through the EGR cooler 11 and the EGR passage part 10E as EGR gas, and flows to the terminal-side EGR passage part 2A (see FIG. 3) formed at a rear end part of the cylinder head 2. The EGR gas that has passed through the terminal-side EGR passage part 2A is returned to an intake passage such as the intake manifold 14. The exhaust gas that has passed through the supercharger 12 is sent to the exhaust treatment device 5 through an exhaust duct 16.

As shown in FIGS. 4 to 6, the exhaust outlet part 10C to the supercharger 12 is provided at a position other than a central part in a longitudinal direction (a front-rear direction) of the confluence pipe part 10B, specifically, provided so as to match a position of a third exhaust branch pipe 10A, which is the third from the front. The exhaust outlet part 10C is formed in a state of being taken out from the confluence pipe part 10B in a direction (a left direction) intersecting the longitudinal direction, and having a detour shape curved when viewed in the front-rear direction.

Each exhaust branch pipe 10A and a branch pipe passage 10a, which is an internal passage of the exhaust branch pipe 10A, extend toward the left and right, and the confluence pipe part 10B and a confluence passage 10b, which is an internal passage of the confluence pipe part 10B, extend in the front-rear direction. The exhaust outlet part 10C is internally formed with an exhaust outlet passage 10c that is approximately curved so as to turn to an oblique direction extending from the upper right to the lower left of an outlet flange 19 connected to the exhaust introduction part 12C, from a horizontal direction of a take-out point from the confluence pipe part 10B.

The exhaust outlet passage 10c is formed to be curved in a state where an axial center 20p of the exhaust outlet passage 10c at a confluence starting end 20, which is the take-out point from the confluence pipe part 10B in the exhaust outlet part 10C, intersects an axial center 19p of the exhaust outlet passage 10c in the outlet flange 19, at an intersection angle θ of about 120 to 130 degrees (for example: 124 degrees). The axial center 20p at the confluence starting end is also an axial center of a third branch pipe passage 10a.

The outlet flange 19 is formed with internal threaded parts 18 at three locations, front left, rear left, and middle right, and the exhaust outlet passage 10c is formed so as to avoid the middle-right internal threaded part 18 below and forward. That is, the internal threaded part 18 to bolt the exhaust introduction part 12C of the supercharger 12 is formed in the exhaust outlet part 10C, and the exhaust outlet passage 10c formed in the exhaust outlet part 10C is formed in a curved shape that detours the internal threaded part 18.

Then, in the exhaust outlet passage 10c, a width of a portion 21 that detours the internal threaded part 18 is expanded in a direction (the front-rear direction) intersecting a detour direction. Here, the "detour direction" is a direction (a vertical direction, a horizontal direction, and the like) along a virtual vertical plane extending left, right, up, and down, including the axial center 20p at the confluence starting end and the axial center 19p at the outlet flange. An example of the direction intersecting the virtual vertical plane is the front-rear direction as an orthogonal direction.

As shown in FIG. 5, the expansion of the width of the detour portion 21 is, specifically, made by providing a large angle R at a boundary between the exhaust outlet passage 10c and the confluence passage 10b formed in the confluence pipe part 10B. Since a vertical length of the detour portion 21 is compressed by the presence of the internal threaded part 18, the detour portion 21 is a section to eliminate (or suppress) reduction of a cross-sectional area by expanding a left-right width more than other parts.

By connecting the confluence passage 10b and the exhaust outlet passage 10c with the large angle R, a front-rear width of the detour portion 21 in the exhaust outlet part 10C is substantially expanded, and it is possible to secure the cross-sectional area. Note that, as an approach for expanding the width, a configuration may be adopted in which a dimension itself of the front-rear width of the detour portion 21 is set larger than that of other portions.

As shown in FIG. 5, in the confluence pipe part 10B and the confluence passage 10b that basically extend in the front-rear direction, a portion between the third exhaust branch pipe 10A, which is the third from the front, and the fourth exhaust branch pipe 10A at a rearmost part, is an oblique passage 10n in which a rear side is toward the right. Due to space restriction and the like, the fourth exhaust branch pipe 10A can be shortened, and a compact configuration without interference with the EGR passage part 10E can be achieved.

Next, the exhaust manifold 10, the EGR cooler 11, and the like will be described. As shown in FIGS. 4 to 9, the EGR passage part 10E is formed at a rear end part (an example of one end part in the longitudinal direction) in the confluence pipe part (an example of an exhaust confluence part) 10B, and the gas lead-out part 10D to take out EGR gas is formed at a front end part (an example of another end part in the longitudinal direction) of the confluence pipe part 10B. The exhaust branch pipe (an example of an exhaust inlet part) 10A, the confluence pipe part 10B, the exhaust outlet part 10C, and the EGR passage part 10E are integrally formed of a cast iron material. That is, the exhaust manifold 10 is made of cast iron.

As shown in FIGS. 4, 5, 7, and 9, the gas lead-out part 10D is formed with a ¼ arc-shaped EGR lead-out path 10d that opens at an intersection of a front end of the confluence passage 10b and a terminal end (a left end) of a first branch pipe passage 10a in a state of facing downward at a left front part. Then, a portion where the EGR lead-out path 10d opens downward is formed in the front flange part (an example of a mounting part) 22.

The front flange part 22 has round holes (not shown) at two locations for bolting, and also has an abutting surface 22a that is formed downward and in a horizontal plane. A position of a left end of the gas lead-out part 10D is set to a position that is equal to or slightly closer to a right side (inside) of a position of a left end of the exhaust outlet part 10C (see FIG. 5). A diameter (a cross-sectional area) of the EGR lead-out path 10d is smaller than a diameter (a cross-sectional area) of the branch pipe passage 10a.

As shown in FIGS. 4 to 9, the EGR passage part 10E is formed with a bent EGR passage 10e between a forward-facing inlet opening 25 of the rear flange part 23 and a right-facing outlet opening 26 of the large mounting flange 24. The inlet opening 25 is at a position below and on the left side with respect to the confluence pipe part 10B, and the outlet opening 26 is arranged at a position immediately after and slightly below a fourth branch pipe passage. Therefore, the EGR passage part 10E and the EGR passage 10e are formed as an oblique passage with a direction changed at two locations, a front end part and a rear end part.

The large mounting flange 24 has a connection surface 24a having a substantially trapezoidal shape with a wide bottom and a right-facing vertical plane, and bolt holes 10h at a total of three locations of one upper location and two lower locations. The bolt hole 10h on a lower front side can be provided at a position that is vertically middle of the confluence pipe part 10B and an EGR starting end 27, which is on a front side of the EGR passage part 10E, and that does not interfere with either the EGR passage 10e or the confluence passage 10b (the oblique passage 10n). Further, a seat hole 28 of the bolt hole 10h on a lower front side has a diameter large enough to be used by a general bolt turning tool (such as a socket for a socket wrench, and the like) without any problem.

Figure 8:
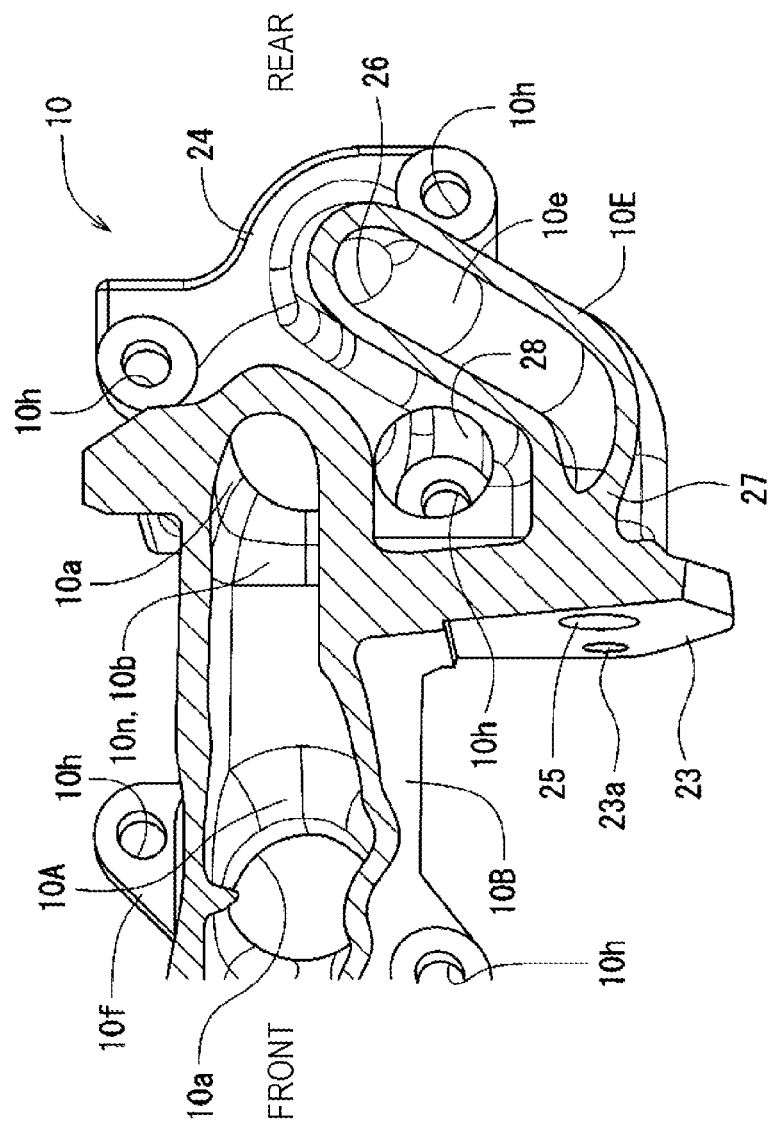
FIG. 8 is a partially-cut perspective view cut vertically at a rear part of the exhaust manifold and viewed from a side.
Figure 9:
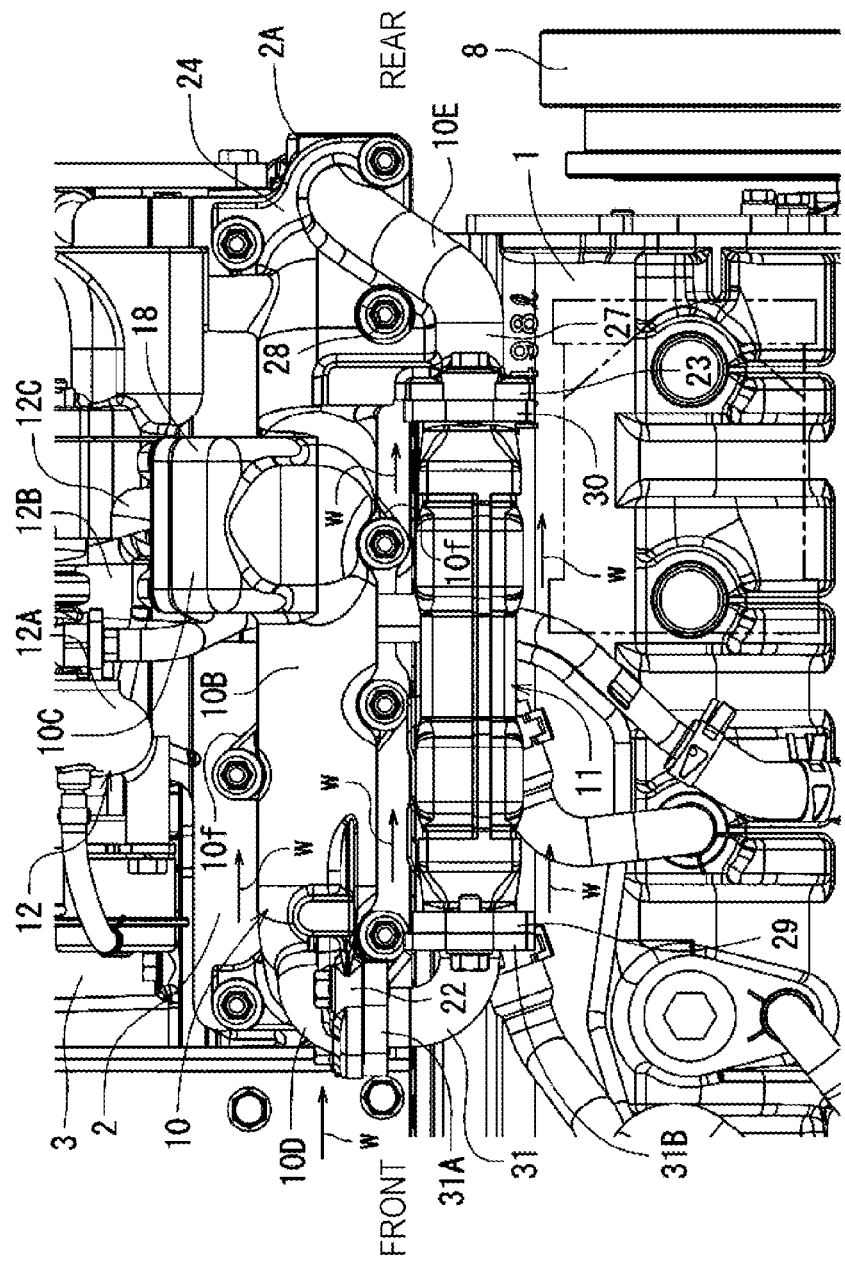
FIG. 9 is an enlarged side view of a main part showing the exhaust manifold and an EGR cooler.

As shown in FIGS. 5 and 9, the EGR cooler (an example of an EGR passage member) 11 includes supporting flanges 29 and 30 at front and rear ends, respectively, and a cylindrical cooler body 11A between the front supporting flange 29 and the rear supporting flange 30, and is internally formed with a large EGR passage (not shown). The front supporting flange 29 is screwed with an elbow pipe 31, the elbow pipe 31 is bolted to the front flange part 22, and the rear supporting flange 30 is bolted to the rear flange part 23 with use of screwing holes 23a and 23a (see FIG. 8).

The elbow pipe 31 is a 90-degree bent pipe having a front mounting flange 31A, a rear mounting flange 31B, and an elbow pipe body 31C made of a pipe material. The front mounting flange 31A is bolted to the front flange part 22, and the rear mounting flange 31B is bolted to the front supporting flange 29. That is, EGR gas (exhaust gas) from the gas lead-out part 10D of the exhaust manifold 10 enters the EGR cooler 11 through the elbow pipe 31, and the EGR gas cooled to some extent by the EGR cooler 11 passes through the EGR passage part 10E, and then flows to a gas passage 2a (see FIG. 5) of the terminal-side EGR passage part 2A on a terminal-end side of the cylinder head 2.

The EGR cooler 11 has a long shape that is long in the front-rear direction, and an appropriate gap is secured between with the exhaust manifold 10 vertically and between with the cylinder head 2 horizontally. Therefore, backward cooling air w by a cooling fan 32 (see FIG. 2) installed in a front part of the engine flows well near a surface of the EGR cooler 11, which exhibits a favorable air cooling action.

[About Action and Effect]

The exhaust manifold 10 includes the exhaust branch pipes (the exhaust inlet parts) 10A at four locations corresponding to a plurality of exhaust ports p1 to p4, one exhaust outlet part 10C, and the exhaust pipe part (the exhaust confluence part) 10B to collect exhaust gas from the exhaust branch pipe 10A and send to the exhaust outlet part 10C. Further, in the engine exhaust manifold 10, the EGR passage part 10E to send EGR gas toward an intake passage is formed. That is, the EGR passage (the EGR passage part 10E) is integrally formed with the exhaust manifold 10.

This eliminates or substantially eliminates "possibility that the EGR passage and a structure in the vicinity (such as the exhaust manifold, or the like) may interfere with each other due to vibration, and may be damaged or broken". The exhaust manifold 10 is excellent in strength and rigidity, which eliminates a phenomenon that the EGR passage part 10E comes into contact with a structure in the vicinity other than the exhaust manifold 10. The EGR passage part 10E and the exhaust manifold 10 are integrated, which solves the conventional problem that the engine tends to be bulky (larger) due to the need to provide a certain gap.

As a result, it is possible to provide the improved engine exhaust manifold 10 with EGR that can also be reliably applied to a small engine, by devising a structure focusing on the exhaust manifold 10 having relatively sufficient strength, to enable sufficient strength of the EGR passage (the EGR passage part 10E) and arrangement in a saved space.

The EGR passage part 10E is formed at the rear end part, which is one end part in the longitudinal direction of the confluence pipe part 10B, and the gas lead-out part 10D to take out EGR gas is formed at a front end part, which is another end part in the longitudinal direction of the confluence pipe part 10B. Therefore, an external EGR passage (external EGR) such as the EGR cooler 11 can be provided between the gas lead-out part 10D and the starting end of the EGR passage part 10E, and flexibility in designing can be improved.

In this case, by providing, at starting ends of the gas lead-out part 10D and the EGR passage part 10E, the mounting parts 22 and 23 to mount the EGR cooler 11 (the EGR passage member 11) connecting these two 10D and 10E, attachment and detachment of the EGR cooler 11 is favorably facilitated. The mounting part 23 of the EGR passage part 10E is a flange part to bolt the EGR passage member 11. Making the flange part 23 continuous with the confluence pipe part 10B can favorably improve the strength and rigidity of the EGR passage part 10E.

At a terminal end of the EGR passage part 10E, the terminal mounting part 24 to connect the terminal-side EGR passage part 2A is formed. The terminal mounting part 24 is also a mounting part (the mounting flange 100 to mount, to the cylinder head 2, the fourth exhaust branch pipe 10A at a rearmost part of the four exhaust branch pipes 10A. Therefore, functions of the EGR passage part 10E and the exhaust branch pipe 10A can be combined, and a more rational exhaust manifold integrated with EGR passage has been realized.

Figure 10:
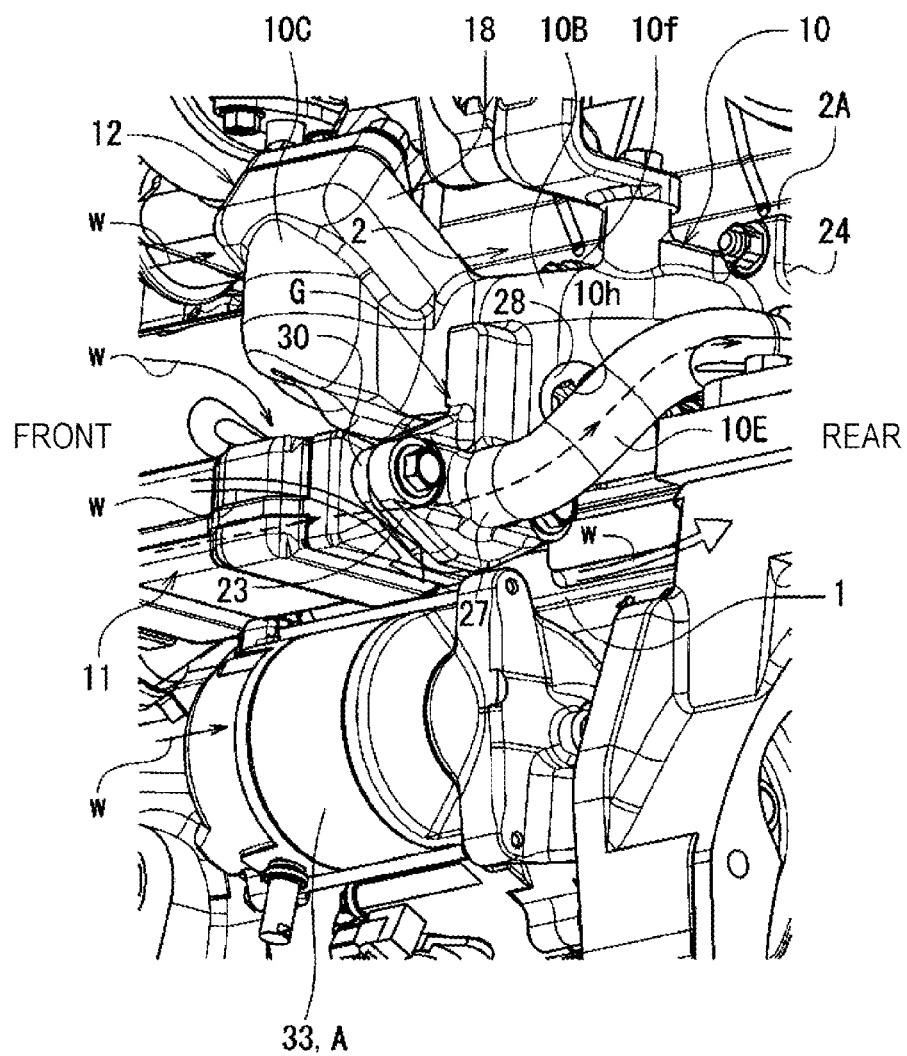
FIG. 10 is a schematic view showing a flow of cooling air near a rear part of the exhaust manifold.

As shown in FIGS. 9 and 10, the exhaust manifold 10 is formed with a guide part G to guide the cooling air w by the cooling fan 32 (see FIG. 2) to a starter mechanism (a starter, sel-motor) 33 that is an engine auxiliary machine A. The guide part G is configured with the EGR passage part 10E that is formed in the confluence pipe part 10B for sending the EGR gas toward the intake passage.

At a rear part of the left side of the engine E and on a front side of the flywheel 8, the starter mechanism 33 for engine starting is installed. The starter mechanism 33 is located below a rear part of the EGR cooler 11, and is a place where a thermal load is large. The EGR passage part 10E in the exhaust manifold 10 projects laterally obliquely downward (obliquely downward to the left) largely from the confluence pipe part 10B, and is located just immediately above the starter mechanism 33.

Therefore, the EGR passage part 10E projecting laterally downward is turned downward by the rear flange part 23 in particular, which promotes a flow of the cooling air w flowing near the exhaust manifold 10 and the EGR cooler 11 to the starter mechanism 33, in the backward cooling air w generated by rotation of the cooling fan 32. That is, as shown in FIG. 10, the EGR passage part 10E functions as the guide part G, and the cooling air w effectively cools the starter mechanism 33, which is the engine auxiliary machine A that is easily overheated.

As described above, the bolt hole 10h on the lower front side of the large mounting flange 24 is arranged between the EGR starting end 27 of the EGR passage part 10E and the exhaust confluence part 10B. Therefore, there is nothing to block the left side of the seat hole 28, and a bolt and a nut can be favorably turned without problems. In addition, there is also a good point that a favorable heat dissipation effect can be expected from the seat hole 28 in a state of being opened on the left side. There is also an advantage that heat trapped during dead soaking is easily discharged (released) from the seat hole (a tool path hole) 28.

As shown in FIGS. 4, 5, 8, and 10, since the tubular EGR passage 10e is formed inside the EGR passage part 10E, and an outer shape of the EGR passage part 10E is set to have a curved surface that matches the shape of the EGR passage 10e, smooth and efficient flow of the cooling air w passing in the vicinity can be expected.

Further, as shown in FIGS. 4, 5 and 8, since the EGR passage part 10E has a shape in which the rear is narrowed as a whole, exhaust air after cooling the starter mechanism 33 and the like can flow backward more smoothly. From this point as well, there is also an advantage that the air cooling action of the starter mechanism 33 by the cooling air w is promoted.

The EGR passage part 10E is formed at the rear end part, which is one end part in the longitudinal direction of the confluence pipe part 10B, and the gas lead-out part 10D to take out EGR gas is formed at a front end part, which is another end part in the longitudinal direction of the confluence pipe part 10B. Therefore, an external EGR passage (external EGR) such as the EGR cooler 11 can be provided between the gas lead-out part 10D and the starting end of the EGR passage part 10E, and flexibility in designing can be improved.

Then, by providing, at starting ends of the gas lead-out part 10D and the EGR passage part 10E, the mounting parts 22 and 23 to mount the EGR cooler 11 (the EGR passage member 11) connecting these two 10D and 10E, attachment and detachment of the EGR cooler 11 is favorably facilitated. The mounting part 23 of the EGR passage part 10E is a flange part to bolt the EGR passage member 11. Making the flange part 23 continuous with the confluence pipe part 10B can favorably improve the strength and rigidity of the EGR passage part 10E.

The exhaust outlet part 10C is formed in a state of being taken out from the confluence pipe part 10B in a direction (a horizontal direction) intersecting the longitudinal direction (the front-rear direction), and in a state where the exhaust outlet passage 10c has a detour shape curved so as to change the direction by about 120 degrees from the left direction to the oblique upper right.

According to this configuration, since a length of the exhaust outlet passage 10c can be made longer than that of a case of not being curved, it is possible to suppress variations in the passage length from the exhaust branch pipe to the supercharger in each cylinder even if the exhaust outlet part 10C is located other than a central part in the longitudinal direction of the confluence pipe part 10B. As a result, it is possible to realize a comprehensively improved engine exhaust manifold with a supercharger so as to enable downsizing for arrangement in a narrow space, while eliminating or suppressing exhaust interference.

The exhaust outlet passage 10c formed in the exhaust outlet part 10C is formed in a curved shape that detours the middle-right internal threaded part 18. Therefore, there is an advantage that it is possible to provide a rational structure in which the starting end and the terminal end of the exhaust outlet part 10C are connected by the internal threaded part 18 to enable enhanced strength and rigidity, while effectively utilizing a space inside the curve for an arrangement space of a mounting section of the supercharger 12.

In the exhaust outlet passage 10c, a width of the portion 21 that detours the internal threaded part 18 is expanded in a direction (the front-rear direction) intersecting the detour direction. Therefore, a decrease in a cross-sectional area of the exhaust outlet passage 10c due to the detour can be eliminated or suppressed. Therefore, although the curved exhaust outlet part 10C tends to be disadvantageous in terms of the arrangement space, there is an advantage that a decrease in the cross-sectional area can be suppressed, and a smooth exhaust gas flow can be ensured.

As long as the expansion of the width of the detour portion 21 is made by providing the angle R at a boundary between the exhaust outlet passage 10c and the confluence passage 10b formed in the confluence pipe part 10B, there is an advantage that the above-mentioned "smooth exhaust gas flow" can be realized while further smoothing the flow of exhaust gas from the confluence passage 10b to the exhaust outlet passage 10c.

It is possible to adopt a configuration in which the take-out point 20 of the exhaust outlet part 10C from the confluence pipe part 10B is arranged on an extension line of any one of the plurality of exhaust branch pipes 10A, such as a configuration in which the take-out point 20 is on an extension line of the second or third exhaust branch pipe 10A in the in-line 4-cylinder engine. Therefore, similarly to a case of extending an exhaust passage length (an exhaust port length), it is possible to obtain an effect of suppressing exhaust interference, such as, for example, a situation where the first cylinder and the third cylinder are likely to cause exhaust interfere with each other among the four cylinders on combustion timing of a plurality of cylinders.

In both end parts of the confluence pipe part 10B, the gas lead-out part 10D for EGR is provided at an end part (a front end part) on the far side in the longitudinal direction of the exhaust manifold 10 with the exhaust outlet part 10C as a reference. Therefore, a well-balanced exhaust manifold 10 has been realized that can smoothly send most of the exhaust gas to the supercharger and can also favorably take out the exhaust gas for EGR.

Other Embodiment

A structure may be adopted in which both the elbow pipe 31 and the EGR cooler 11 are integrally formed with the exhaust manifold 10 by a casting material or the like.

The present invention is also applicable to an exhaust manifold having a structure in which the exhaust branch pipe (the exhaust inlet part) 10A is substantially very short or absent (a box-type exhaust manifold). In a case of a box-type exhaust manifold with one opening that covers a plurality of exhaust ports of the cylinder head, the exhaust inlet part 10A is one large opening. Further, in the box-type exhaust manifold, the confluence pipe part 10B is one large exhaust confluence part.

What is claimed is:

1. An engine exhaust manifold comprising:
   an exhaust inlet part corresponding to a plurality of exhaust ports;
   one exhaust outlet part;
   an exhaust confluence part to collect exhaust gas from the exhaust inlet part and send to the exhaust outlet part, the engine exhaust manifold being formed with an EGR passage part to send EGR gas toward an intake passage, the EGR passage part being formed at one end part in a longitudinal direction of the exhaust confluence part; and
   a gas lead-out part to take out EGR gas formed at another end part in the longitudinal direction of the exhaust confluence part,
   wherein, mounting parts to mount an EGR passage member connecting both the gas lead-out part and the EGR passage part are provided at starting ends of the gas lead-out part and the EGR passage part.

2. The engine exhaust manifold according to claim 1, wherein the mounting part of the EGR passage part is a flange part to bolt the EGR passage member, and the flange part is continuous with the exhaust confluence part.

3. The engine exhaust manifold according to claim 1, wherein a terminal mounting part to connect a terminal-side EGR passage part is formed at a terminal end of the EGR passage part, and the terminal mounting part is also a mounting part to mount one of a plurality of the exhaust inlet parts to a cylinder head.

4. The engine exhaust manifold according to claim 1, wherein a guide part to guide cooling air to an engine auxiliary machine is formed.

5. The engine exhaust manifold according to claim 4, wherein the guide part is configured with the EGR passage part formed in the exhaust confluence part.

6. The engine exhaust manifold according to claim 5, wherein an EGR passage having a tubular shape is formed inside the EGR passage part, and an outer shape of the EGR passage part is set to have a curved surface that matches a shape of the EGR passage.

7. The engine exhaust manifold according to claim 5, wherein a bolt hole to bolt the exhaust inlet part to a cylinder head is formed between the EGR passage part and the exhaust confluence part.

8. The engine exhaust manifold according to claim 5, wherein the EGR passage part is formed at one end part in a longitudinal direction of the exhaust confluence part, and a gas lead-out part to take out EGR gas is formed at another end part in the longitudinal direction of the exhaust confluence part.

9. The engine exhaust manifold according to claim 8, wherein, at starting ends of the gas lead-out part and the EGR passage part, mounting parts to mount an EGR passage member connecting both the gas lead-out part and the EGR passage part is provided.

10. The engine exhaust manifold according to claim 1, wherein an exhaust outlet part to a supercharger is provided at a position other than a central part in a longitudinal direction of the exhaust confluence part, and the exhaust outlet part is formed in a state of being taken out from the exhaust confluence part in a direction intersecting the longitudinal direction, and having a curved detour shape.

11. The engine exhaust manifold according to claim 10, wherein an internal threaded part to bolt an exhaust introduction part of the supercharger is formed in the exhaust outlet part, and an exhaust outlet passage formed in the exhaust outlet part is formed in a curved shape that detours the internal threaded part.

12. The engine exhaust manifold according to claim 11, wherein, in the exhaust outlet passage, a width of a portion that detours the internal threaded part is expanded in a direction intersecting a detour direction.

13. The engine exhaust manifold according to claim 12, wherein expansion of a width of the portion that detours is made by providing an angle at a boundary between the exhaust outlet passage and an exhaust confluence passage formed in the exhaust confluence part.

14. The engine exhaust manifold according to claim 10, wherein a take-out point of the exhaust outlet part from the exhaust confluence part is arranged on an extension line of any one of a plurality of the exhaust branch pipes.

15. The engine exhaust manifold according to claim 14, wherein four of the exhaust branch pipes are aligned, and the take-out point is provided on an extension line of a second or third exhaust branch pipe.

16. The engine exhaust manifold according to claim 10, wherein, among both end parts of the exhaust confluence part, a gas lead-out part for EGR is provided at a far side end part with the exhaust outlet part as a reference.

* * * * *